United States Patent
Perciot et al.

(10) Patent No.: US 8,625,389 B2
(45) Date of Patent: Jan. 7, 2014

(54) SYSTEM AND TECHNIQUE TO SUPPRESS THE ACQUISITION OF TORQUE NOISE ON A MULTI-COMPONENT STREAMER

(75) Inventors: Patrick Perciot, Oslo (NO); Ahmet Kemal Ozdemir, Asker (NO); Lars Borgen, Sande (NO)

(73) Assignee: WesternGeco L.L.C., Houston, TX (US)

( * ) Notice: Subject to any disclaimer, the term of this patent is extended or adjusted under 35 U.S.C. 154(b) by 414 days.

(21) Appl. No.: 12/896,660

(22) Filed: Oct. 1, 2010

(65) Prior Publication Data

US 2012/0082000 A1  Apr. 5, 2012

(51) Int. Cl.
*G01V 1/36* (2006.01)
*G01V 1/38* (2006.01)

(52) U.S. Cl.
USPC .......................................................... 367/21

(58) Field of Classification Search
USPC ............................................... 367/15, 21, 24
See application file for complete search history.

(56) References Cited

U.S. PATENT DOCUMENTS

| | | | |
|---|---|---|---|
| 6,651,007 B2 * | 11/2003 | Ozbek ............................. | 702/17 |
| 2003/0078734 A1 * | 4/2003 | Ozbek ............................. | 702/14 |
| 2008/0151689 A1 | 6/2008 | Goujon | |
| 2008/0219095 A1 | 9/2008 | Perciot et al. | |
| 2009/0092003 A1 | 4/2009 | Goujon et al. | |
| 2009/0092006 A1 | 4/2009 | Teigen et al. | |
| 2010/0202251 A1 * | 8/2010 | Ozdemir et al. ................. | 367/24 |
| 2011/0103181 A1 * | 5/2011 | Ozdemir et al. ................. | 367/24 |
| 2012/0069706 A1 * | 3/2012 | Goujon et al. .................. | 367/37 |

OTHER PUBLICATIONS

International Search Report and Written Opinion of PCT Application No. PCT/US2011/052075 dated Apr. 13, 2012: pp. 1-9.

* cited by examiner

*Primary Examiner* — Ian J Lobo (57) ABSTRACT

A technique includes receiving particle motion data acquired by particle motion sensors while in tow. The particle motion data are indicative of a seismic signal and a torque noise, and the particle motion sensors are oriented to modulate a wavenumber of a first component of the torque noise away from a signal cone that is associated with the seismic signal. The technique includes estimating the first component of the torque noise and based at least in part on the estimated first component, estimating a second component of the torque noise inside the signal cone. The technique includes suppressing the second component of the torque noise based at least in part on the estimated second component.

26 Claims, 11 Drawing Sheets

SYSTEM AND TECHNIQUE TO SUPPRESS THE ACQUISITION OF TORQUE NOISE ON A MULTI-COMPONENT STREAMER

BACKGROUND

The invention generally relates to a system and technique to suppress the acquisition of torque noise on a multi-component streamer.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes receiving particle motion data acquired by particle motion sensors while in tow. The particle motion data are indicative of a seismic signal and a torque noise, and the particle motion sensors are oriented to modulate a wavenumber of a first component of the torque noise away from a signal cone that is associated with the seismic signal. The technique includes estimating the first component of the torque noise and based at least in part on the estimated first component, estimating a second component of the torque noise inside the signal cone. The technique includes suppressing the second component of the torque noise based at least in part on the estimated second component.

Advantages and other features of the invention will become apparent from the following drawing, description and claims.

DETAILED DESCRIPTION

Figure 1:
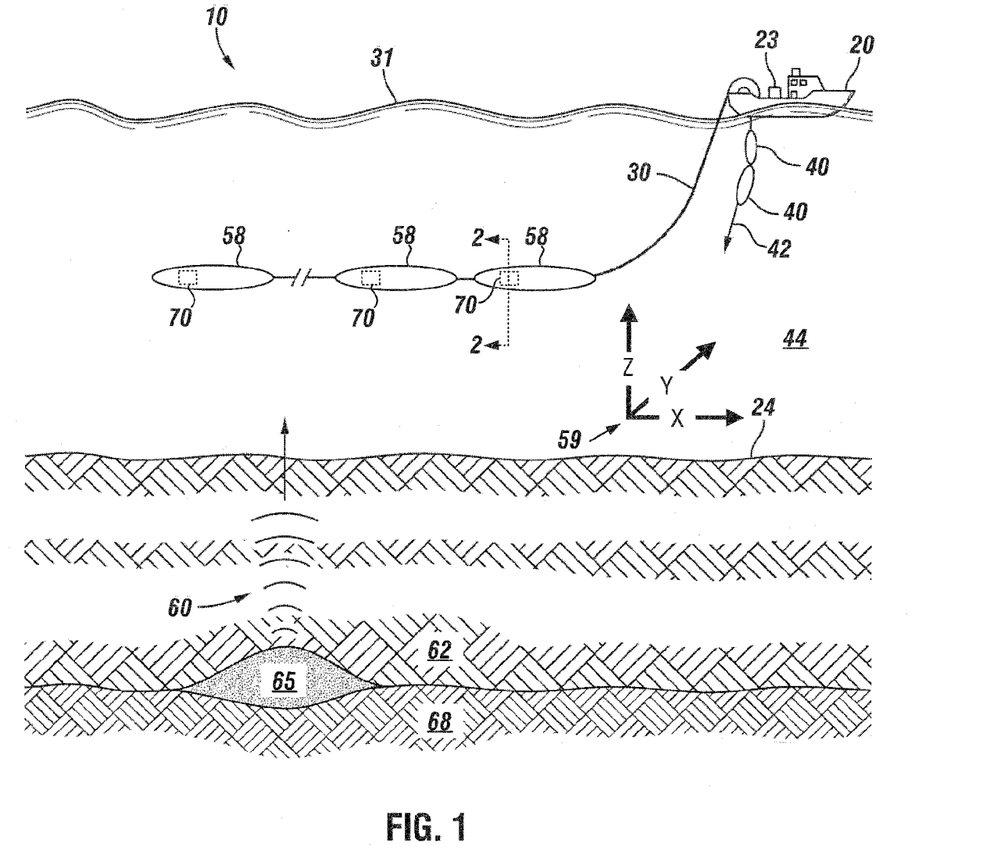
FIG. 1 is a schematic diagram of a marine seismic acquisition system according to an embodiment of the invention.

FIG. 1 depicts an embodiment 10 of a marine-based seismic data acquisition system in accordance with some embodiments of the invention. In the system 10, a survey vessel 20 tows one or more seismic streamers 30 (one exemplary streamer 30 being depicted in FIG. 1) behind the vessel 20. In one non-limiting example, the streamers 30 may be arranged in a spread in which multiple streamers 30 are towed in approximately the same plane at the same depth. As another non-limiting example, the streamers may be towed at multiple depths, such as in an over/under spread, for example.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals. The streamers 30 contain seismic sensor units 58, which include, in accordance with embodiments of the invention, multi-component sensors. Each multi-component sensor is capable of detecting a pressure wavefield and at least one component of a particle motion that is associated with acoustic signals that are proximate to the sensor. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor may include one or more hydrophones, geophones, particle displacement sensors, particle velocity sensors, accelerometers, pressure gradient sensors, or combinations thereof.

For example, in accordance with some embodiments of the invention, a particular seismic sensor unit 58 may include at least one particle motion sensor 70 for purposes of measuring a component of particle motion along a particular sensitive axis 59 (the x, y or z axis, for example). As a more specific example, the seismic sensor unit 58 may include a particle velocity sensor that is oriented to acquire a measurement of a particle velocity along the depth, or z, axis; a particle velocity sensor to sense a particle velocity along the crossline, or y, axis; a particle velocity sensor to sense a velocity along the inline, or x, axis; multiple particle velocity sensors to sense particle velocities along all three (x, y and z) axes; etc. Alternatively, in other embodiments of the invention, the particle motion sensor(s) of each seismic sensor unit 58 may sense a particle motion other than velocity (an acceleration, for example).

In addition to the seismic sensor units 58, the marine seismic data acquisition system 10 also includes one or more seismic sources 40 (two exemplary seismic sources 40 being depicted in FIG. 1), such as air guns and the like. In some embodiments of the invention, the seismic source(s) 40 may be coupled to, or towed by, the survey vessel 20. Alternatively, in other embodiments of the invention, the seismic source(s) 40 may operate independently of the survey vessel 20, in that the source(s) 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic source(s) 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are created by the source(s) 40 produce corresponding reflected acoustic signals, or pressure waves 60, which are sensed by the seismic sensors of the seismic sensor unit 58. It is noted that the pressure waves that are received and sensed by the seismic sensors include "up going" pressure waves that propagate to the sensors without reflection, as well as "down going" pressure waves that are produced by reflections of the pressure waves 60 from an air-water boundary, or free surface 31.

The seismic sensors of the seismic sensor units 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular seismic sensor unit 58 may provide a trace, which corresponds to a measure of a pressure wavefield by its hydrophone; and the seismic sensor unit 58 may provide (depending on the particular embodiment of the invention) one or more traces that correspond to one or more components of particle motion.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a data processing system that may be, for example, located on land or on the vessel 20.

For particularly the case in which the streamer 30 has a solid core, the particle motion sensors 70 may acquire a significant degree of noise in addition to the desired particle motion signal. The noise is attributable to several types of noise sources and may include vibration noise, flow noise, acoustic noise, incoherent noise, etc. The noise acquired by the particle motions sensors 70 may also be a function of torque noise, which is introduced due to the eccentric positions of the particle motion sensors 70 with respect to the inline axis of the streamer 30.

Figure 2:
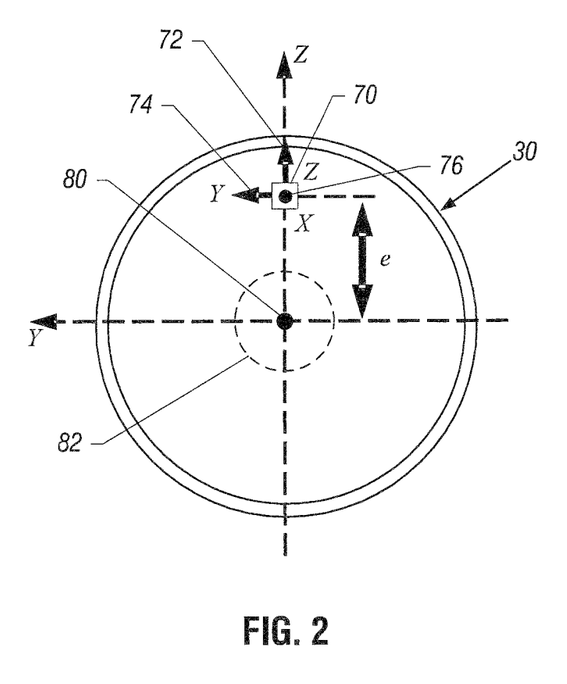
FIG. 2 is a cross-sectional view taken along line 2-2 of FIG. 1 according to an embodiment of the invention.

More specifically, as depicted in an exemplary cross-section of the streamer 30 in FIG. 2, a particle motion sensor 70 may be mounted in the streamer 30 such that the sensor 70 is positioned eccentrically with respect to a central axis 80 of the streamer cable. In other words, the particle motion sensor 70 may be mounted a distance (called "e" in FIG. 2) away from the cable's central inline axis 80. Due to this eccentric positioning, the particle motion sensor 70 is subject to rotation about the axis 80 as the streamer 30 is being towed, and as a result, the measurement acquired by the particle motion sensor 70 contains torque noise that is attributable to this rotation.

In FIG. 2, the particle motion sensor 70 has three primary axes for purposes of sensing particle motion: a vertical, or z, axis 72; a crossline, or y, axis 74; and an inline, or x, axis 76, which is directed out of the page and indicated by the "dot" in FIG. 2. As also depicted in FIG. 2, the streamer 30 may contain a solid core 82.

Because the torque noise is related to the rotation of the streamer 30 about the inline, or x, axis 80, the effect of the torque noise on the measured local crossline, or y, and vertical, or z, components are different, as described below:

$$N_y(t,x)=V_y(t,x)+e\ddot{\theta}(t,x)+R_y(t,x), \text{ and} \qquad \text{Eq. 1}$$

$$N_z(t,x)=V_z(t,x)+e\dot{\theta}^2(t,x)+R_z(t,x), \qquad \text{Eq. 2}$$

where "t" represents time; "x" represents the inline coordinate of the sensor position; "$N_y$" and "$N_z$" represent the y and z components, respectively, of the total noise present in the particle motion measurements; "$V_y$" and "$V_z$" represent the transversal vibration noise components along the y and z axes, respectively; "$\dot{\theta}$" represents the angular velocity about the axis 80; "$\ddot{\theta}$" represents the angular acceleration about the axis 80; and "$R_y$" and "$R_z$" represent the remaining noise components (acoustic noise, ambient noise, etc.) along the y and z axes, respectively.

In Eq. 1, the term "$e\ddot{\theta}(t,x)$" represents the y, or crossline, component of the torque noise, called "$\tau_y(t,x)$," as set forth below:

$$\tau_y(t,x)=e\ddot{\theta}(t,x). \qquad \text{Eq. 3}$$

The $\tau_y(t,x)$ torque noise is usually significant for moderate values of eccentricity e and is referred to as the "torque noise" in the following discussion. It is noted that as set forth in Eq. 2, the cross component of the noise, $N_z(t,x)$, also contains a torque noise component, $e\dot{\theta}^2(t,x)$. However, because the torque induced noise on the local z, or vertical, component is proportional to the square of the angular velocity, the amplitude of this term is relatively small and is considered to be negligible in the following discussion.

Figure 3:
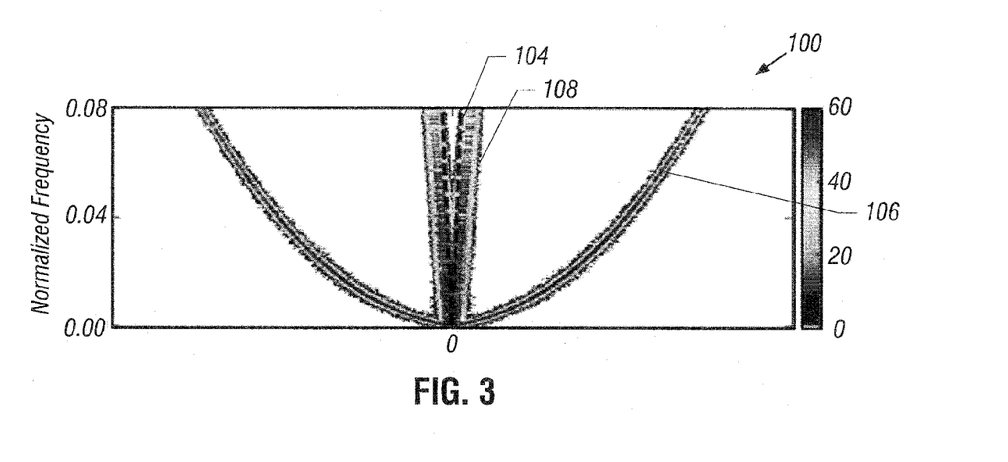
FIG. 3 is a synthetically-generated noise record in frequency-wavenumber space illustrating traversal vibration noise and torque noise.

In general, the propagation of the torque noise on the y component is slower than the seismic signal and faster than the transversal vibration noise. More specifically, FIG. 3 depicts a frequency-wavenumber (f-k) plot 100 of a synthetically-generated noise record acquired by particle motion sensors. This noise record includes transversal vibration noise 106 and torque noise 108. Also depicted in FIG. 3 is a signal cone 104, which defines the boundaries in f-k space for the expected seismic signal. As can be seen in this particular example, the torque noise 108 contaminates mostly the lowest frequencies of the useful seismic frequency band, as the torque noise 108 intersects the lower frequency portion of the signal cone 104. In general, it is difficult through signal processing to discriminate the torque noise inside the signal cone 104 from the desired particle motion signal.

Figure 4:
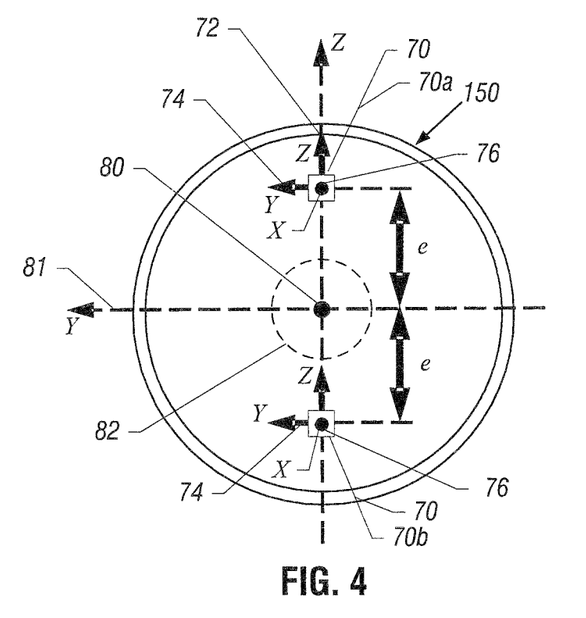
FIG. 4 is a transverse cross-sectional view of a streamer having eccentrically-disposed particle motion sensors, in accordance with an embodiment of the invention.

Referring to FIG. 4, for purposes of suppressing the degree of torque noise that is present in the signal cone 104, two multi-component sensors may be disposed at each inline sensor position. In this regard, referring to FIG. 4 (which depicts a transverse cross-section) a streamer 150, in accordance with embodiments of the invention, may contain two multi-component particle motion sensors (i.e., an upper sensor 70a and a lower sensor 70b, where each sensor 70a, 70b has the same design 70) at each inline sensor location. In accordance with some embodiments of the invention, the upper 70a and lower 70b sensors are located at different positions in the same y-z plane, and more particularly, each sensor 70a, 70b has a different phasing, or angle, about the inline axis 80. In this manner, the upper sensor 70a is disposed at an angle 162 of 90° (measuring in the clockwise direction) with respect to a crossline axis 81 of the streamer; and the lower sensor 70b is disposed at an angle 164 of 270° with respect to the crossline axis 81. In other words, the upper 70a and lower 70b sensors are spaced apart by 180° about the inline axis 80.

Figure 5:
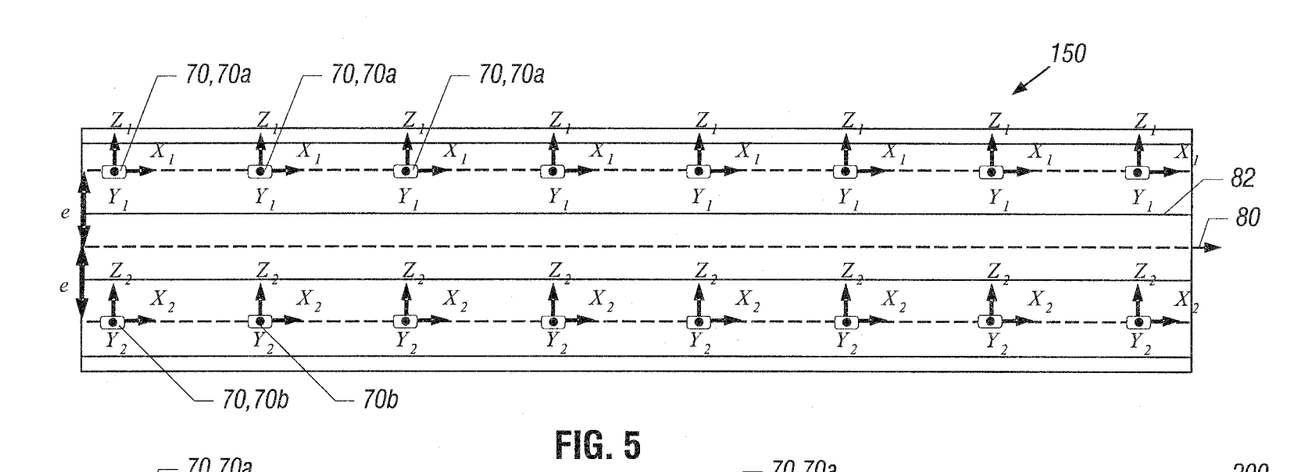
FIG. 5 is a lengthwise cross-sectional view of the streamer of FIG. 4.

Both sensors 70a and 70b are disposed by the distance e from the inline streamer axis 80; and inline (x) 76 (denoted by a "dot" to show the axis 76 pointing out of the page), crossline (y) 74 and depth (z) 72 axes of the sensors 70a and 70b are oriented in the same directions such that the inline axes 76 of the sensors 70a and 70b are parallel, the crossline axes 74 of the sensors 70a and 70b are parallel and the depth axes 72 of the sensors 70a and 70b are parallel. The corresponding lengthwise cross-section of the streamer 150 is depicted in FIG. 5, in which each "dot" in the sensor 70 represents the crossline axis 74 pointing out of the page.

The different phasings of the particle motion sensors 70a and 70b induce torque noise with opposite polarities on the measurements that are acquired by the sensors 70a and 70b, as described below:

$$N_{y_1}(t,x) = V_y(t,x) + e\ddot{\theta}(t,x) + R_{y_1}(t,x), \text{ and} \qquad \text{Eq. 4}$$

$$N_{y_2}(t,x) = V_y(t,x) - e\ddot{\theta}(t,x) + R_{y_2}(t,x), \qquad \text{Eq. 5}$$

where "$N_{y_1}(t,x)$" represents the crossline, or y, component of the total noise acquired by the particle motion sensors 70a; and "$N_{y_2}(t,x)$" represents the crossline, or y, component of the total noise acquired by the particle motion sensors 70b. As can be seen from Eqs. 4 and 5, the measurements acquired by the particle motion sensors 70a and 70b may be added together to significantly suppress, or even eliminate, the sensed torque noise, as the sum of the measurements from particle motion sensors does not have a torque noise component because the opposite polarity components cancel each other out. However, the number of particle motion sensors for the streamer 150 is doubled, as compared to conventional arrangements. Additionally, the extra x and z components of the particle motion sensors are subject to similar noise modes and allow for only negligible additional noise attenuation.

Figure 6:
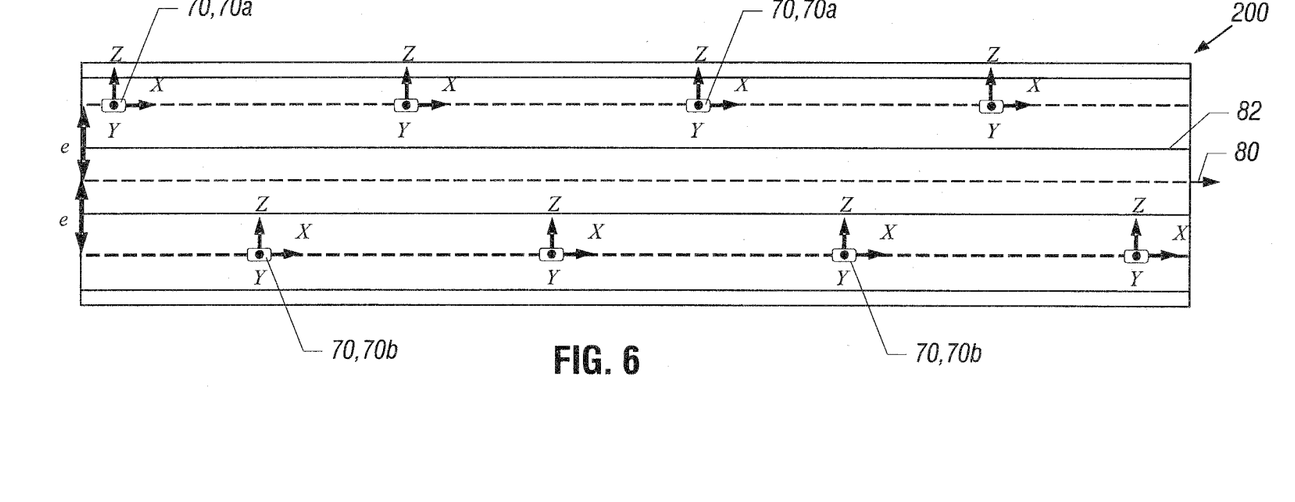
FIG. 6 is a lengthwise cross-sectional view of a streamer having eccentrically-disposed particle motion sensors according to an embodiment of the invention.

Referring to FIG. 6, in accordance with other embodiments of the invention, a seismic streamer 200 (a lengthwise cross-section of which is depicted in FIG. 6) may be used. For the streamer 200, a single multi-component particle motion sensor 70 is disposed at each inline sensor position along the length of the streamer 200, and each particle motion sensor 200 is disposed the same distance e away from the inline axis 80 of the streamer 200. Unlike conventional arrangements, however, the phasing of the particle motion sensors 70 about the inline streamer axis 80 vary along the length of the streamer 200. The variation in phasing can be seen more clearly in FIG. 7, which is an illustration 220 of crossline cross-sections of the streamer 200 (i.e., y-z plane cross-sections) at adjacent sensor locations. As can be seen, the multi-component axes of the sensors 70 are aligned, and the sensor locations in the y-z plane vary by 180° from one adjacent sensor 70 to the next.

Figure 7:
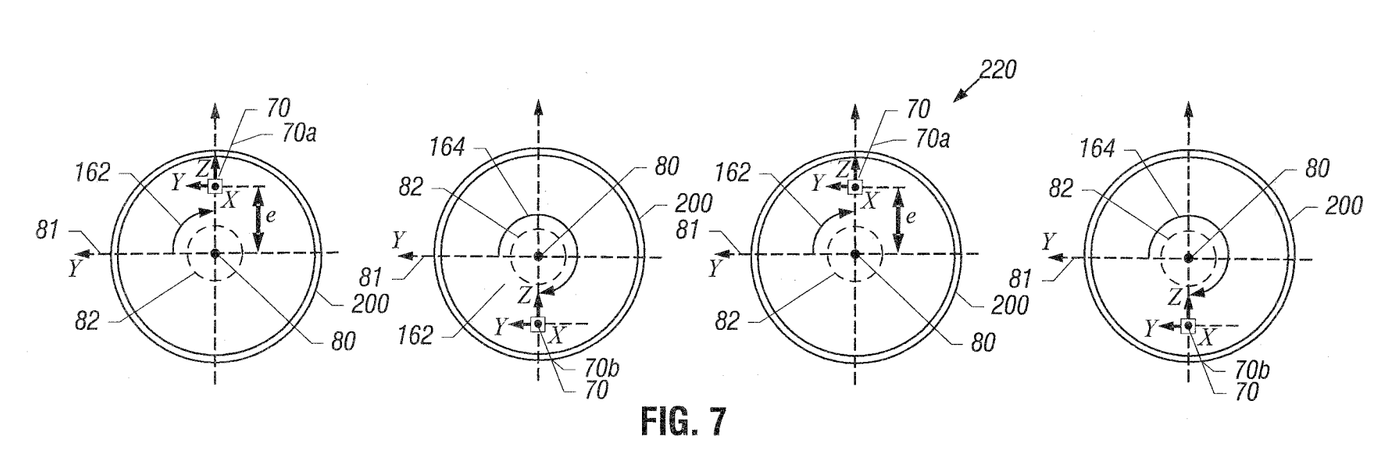
FIGS. 7 and 9 are illustrations of crossline cross-sections of streamers at adjacent sensor locations along the streamers according to embodiments of the invention.

More specifically, beginning with the leftmost cross-section that is depicted in FIG. 7, the sensor 70a is located at the 90° angle 162 about the inline axis 80; the next adjacent sensor 70b (to the left) is located at the 270° angle 164 about the inline axis 80; the next adjacent sensor 70a (to the left) is located at the 90° angle 162 about the inline axis 80; etc. In other words, a 180° phasing scheme is used such that (excluding the first and last sensors 70 on the streamer 200), each sensor 70 is disposed at an angle about the inline axis 80 that is 180° apart from the angles at which the immediately adjacent sensors (one on each side) are disposed.

Due to the above-described phasing, the measured torque noise is wavenumber modulated, as described below for the crossline component of the total noise:

$$N_y(t,x) = V_y(t,x) + e\ddot{\theta}(t,x)(-1)^{n(x)} + R_y(t,x), \qquad \text{Eq. 6}$$

where "n" refers to the index of the corresponding sensor. In other words, the odd-indexed sensors 70 perceive the torque noise with an opposite phase than the even-indexed sensors 70. It is noted that the frequency-wavenumber spectrum of the particle motion signal and the transversal noise are not affected by these alternating orientation(s), because the sensors 70 at opposite sides of the central axis 80 have the same sensitivity (in amplitude and phase) to the signal and transversal vibration.

The corresponding crossline component of the total noise measurement in the frequency-wavenumber domain may be described as follows:

$$N_y(f,k) = \qquad \text{Eq. 7}$$
$$V_y(f,k) + \frac{\tau_y(f, k + K_x/2) + \tau_y(f, k + K_x/2)}{2} + R_y(f,k),$$

where "f" represents the frequency; "k" represents the wavenumber; "$\tau_y(f,k)$" represents the frequency-wavenumber transform of the torque noise, "$e\ddot{\theta}(t,x)$;" and "$K_x/2$" represents the Nyquist wavenumber, which is one half of the inverse of the inline sensor spacing.

Figure 8:
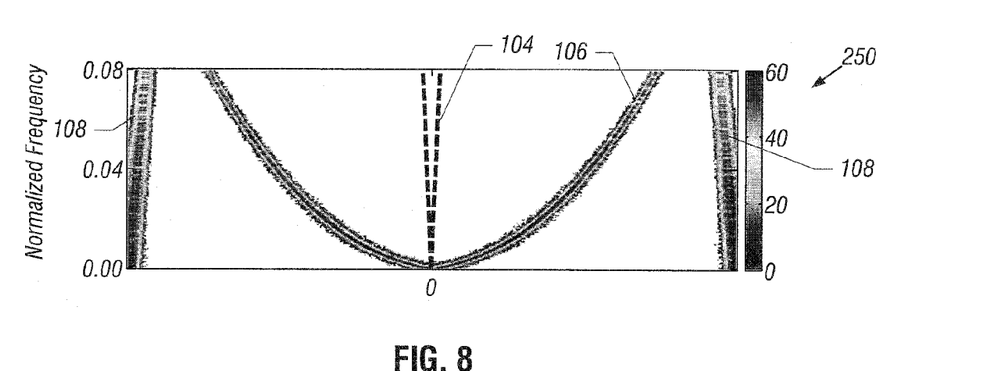
FIG. 8 is a synthetically-generated noise record in frequency-wavenumber space acquired by sensors of the streamer of FIG. 6 according to an embodiment of the invention.

Referring to FIG. 8, a frequency-wavenumber plot 250 of a synthetically-generated noise record illustrates the wavenumber modulation that may be achieved using the sensor orientation that is depicted in FIG. 6. The wavenumber modulation effectively moves the torque noise wavenumbers ("$K_x/2$") away from their original location (see FIG. 3, for example) and out of the signal cone 104.

In accordance with some embodiments of the invention, the particle motion sensors 70 may be arranged in two groups (a first group of sensors 70a and a separate second group of sensors 70b, for example) which form two separate sensor networks (one for each group) that may each independently transfer the acquired data to an onboard acquisition system. In other words, a dual sensor network may be used instead of a single sensor network. This type of implementation may increase the reliability of the data acquisition system. In this regard, if a failure occurs at one of the sensor networks, the other network is available to transfer the acquired data, although the sensor spacing is increased by a factor of two due to the failure. Other variations are contemplated and are within the scope of the appended claims.

Figure 9:
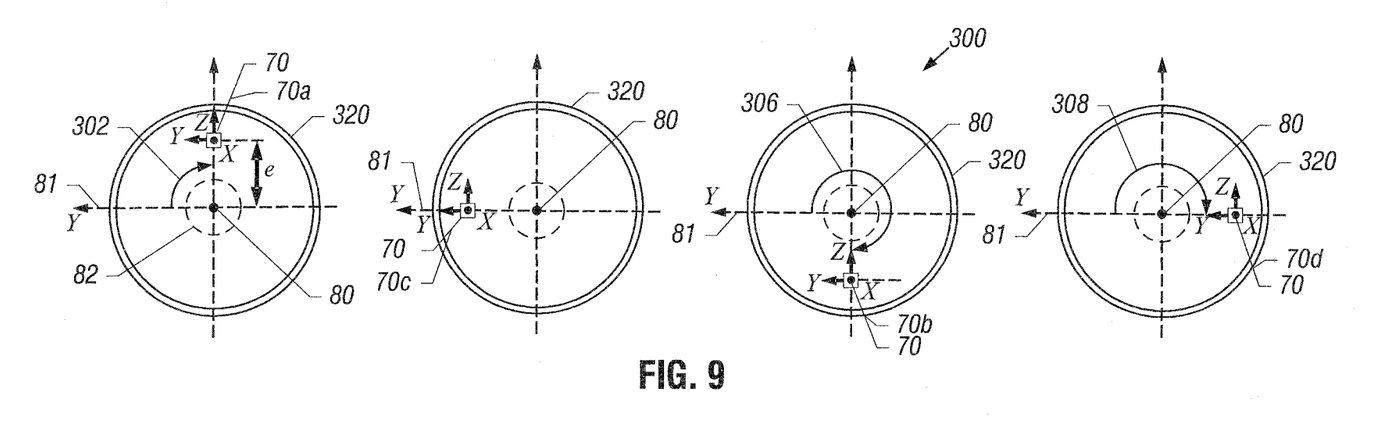

A phasing scheme other than the above-described alternating 180° phasing scheme may be employed in accordance with other embodiments of the invention. As a specific example, FIG. 9 is an illustration 300 of crossline cross-sections of a streamer 320 at inline sensor locations in accordance with another embodiment of the invention. For this embodiment, each inline sensor location has a single multi-component sensor 70, similar to the streamer 200. However, unlike the streamer 200, the streamer 320 employs a 90° phasing scheme in that the sensor locations are rotated by 90° about the inline streamer axis 80 from one adjacent sensor 70 to the next. Thus, each sensor 70 has either a 90° angle (as shown by an exemplary sensor 70a being disposed at a 90° angle 302 about the inline axis 80 with respect to the crossline axis 81); a 0° angle (as shown by an exemplary sensor 70c being disposed at a 0° angle about the inline axis 80 with respect to the crossline axis 81); a 270° angle (as shown by an exemplary sensor 70b being disposed at a 270° angle 306 about the inline axis 80 with respect to the crossline axis 81); or an 180° angle (as shown by an exemplary sensor 70d being disposed at an 180° angle 308 about the inline axis 80 with respect to the crossline axis 81). As with the other embodiments, the respective crossline, inline and depth axes of the sensors 70 remain aligned, regardless of their angles about the inline streamer axis.

Comparing the streamers 200 and 320, the streamer 200 pushes the torque noise further away from the desired seismic signal in the frequency-wavenumber domain than the streamer 320.

Irregularities, such as sensor misalignment, manufacturing or mounting irregularities (as non-limiting examples) may generate a component of the torque noise, which is not wavenumber modulated out of the signal cone, as described above. Instead, this component interferes with the seismic signal inside the signal cone. More specifically, one or more of the above-described irregularities may impart two components to the torque noise: a first component that is suppressed or eliminated due to the wavenumber modulation as described above; and due to one or more irregularities, a second component that interferes with the seismic signal inside the signal cone. Although the second component may be considerably smaller than the first component in magnitude, the second component may still be relatively strong relative to the amplitude of the seismic signal.

In accordance with embodiments of the invention disclosed herein, techniques may be applied for purposes of removing the second component of the torque noise from the signal cone. The techniques and systems that are disclosed herein may thus, be applied to remove or enhance the overall signal-to-noise ratio (SNR) of the particle motion measurements.

The ability to remove the second component of the torque noise stems from the differences between the first component and the seismic signal; and the similarities between the first and second components. More specifically, the first component of the torque noise has significantly different apparent velocities than the seismic signal. Therefore, the first component of the torque noise may be estimated and removed by using a selective frequency-wavenumber filter, without altering the seismic signal. This first component of the torque noise corresponds to an estimate of the term $e\ddot{\theta}(t,x)(-1)^{n(x)}$ in Eq. 6 above and is also indicative of the angular acceleration $\ddot{\theta}(t,x)$.

The angular acceleration of the cable of the streamer about the central cable axis (i.e., about the inline, or x, axis) is the source of both components of the torque noise. Therefore, the estimate of the angular acceleration $\ddot{\theta}(t,x)$, provided by the first component, is highly correlated to the second component of the torque noise.

As described herein, the estimated first component of the torque noise, which may be derived using a selective frequency wavenumber filter, may then be used to derive an estimate of the second component of the torque noise. With this estimate of the second component of the torque noise, the second component may then be subtracted from the content of the signal cone to effectively attenuate the second component of the torque noise from the desired seismic signal.

Figure 10:
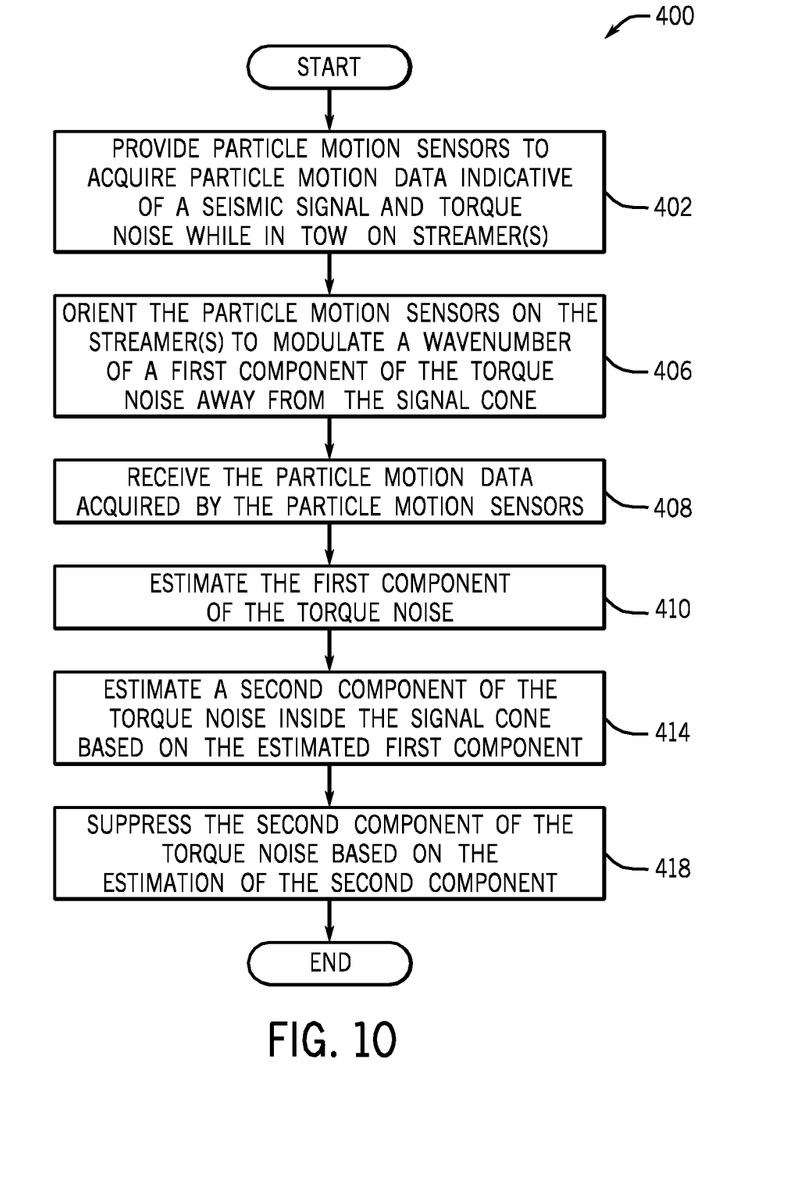
FIG. 10 is a flow chart depicting a technique to suppress torque noise both inside and outside of the signal cone in measurements acquired by towed particle motion sensors according to embodiments of the invention.

Thus, referring to FIG. 10, in accordance with some embodiments of the invention, a technique 400 includes providing (block 402) particle motion sensors to acquire particle motion data indicative of a seismic signal and torque noise while in tow on one or more streamers and orienting (block 406) the particle motion sensors on the streamer(s) to modulate a wavenumber of a first component of the torque noise away from a signal cone, which is associated with the seismic signal. The technique includes receiving (block 408) the particle motion data acquired by the particle motion sensors, estimating (block 410) the first component of the torque noise and based at least in part on the estimated first component, estimating (block 414) a second component of the torque noise inside the signal cone. The technique 400 includes suppressing (block 418) the second component of the torque based at least in part on the estimated second component.

Figure 11:
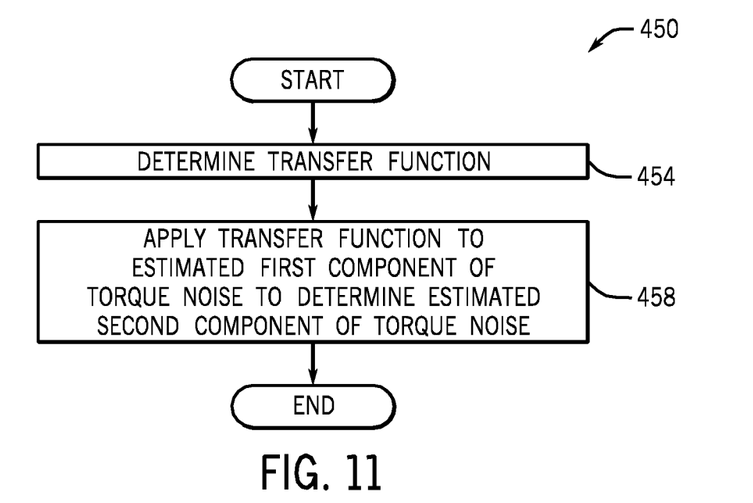
FIGS. 11 and 12 are flow charts depicting techniques to estimate a portion of torque noise present in the signal cone according to different embodiments of the invention.

In accordance with some embodiments of the invention, a technique 450 that is depicted in FIG. 11 may be used for purposes of estimating the second component of the torque noise based on the estimated first component of the torque noise. Pursuant to the technique 450, a transfer function is first determined (block 454), which relates the first and second components. The transfer function is applied to the first component to derive the second component of the torque noise, pursuant to block 458.

Figure 12:
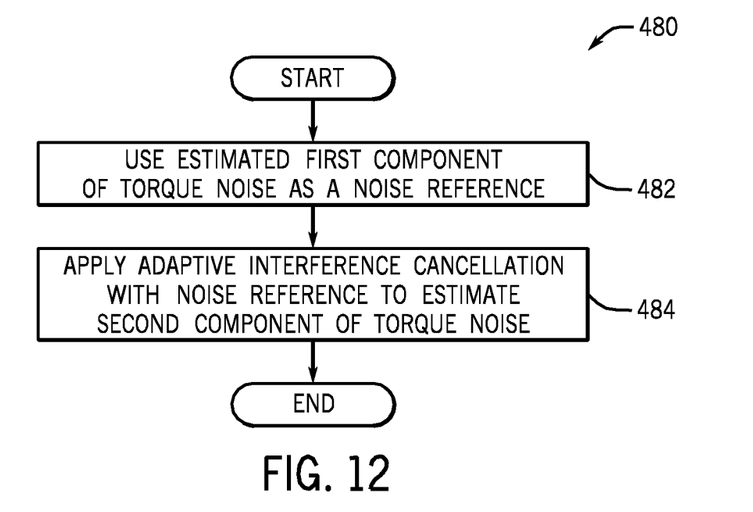

If the transfer function is unknown or significantly complicated to be useful in practice, an adaptive interference cancellation approach may be used in lieu of the transfer function, in accordance with other embodiments of the invention. In this regard, according to a technique 480 depicted in FIG. 12, the estimated first component of the torque noise may be used as a noise reference in the adaptive interference cancellation approach, pursuant to block 482. Thus, the estimated angular acceleration is used as a noise reference to estimate the second component of the torque noise in the adaptive interference calculation, pursuant to block 484. Depending on the particular embodiment of the invention, the adaptive algorithms may be such algorithms as a least mean square (LMS) algorithm, a recursive least square (RLS) or a QR decomposition-based recursive least squares (QR-RLS) algorithm.

Figure 13:
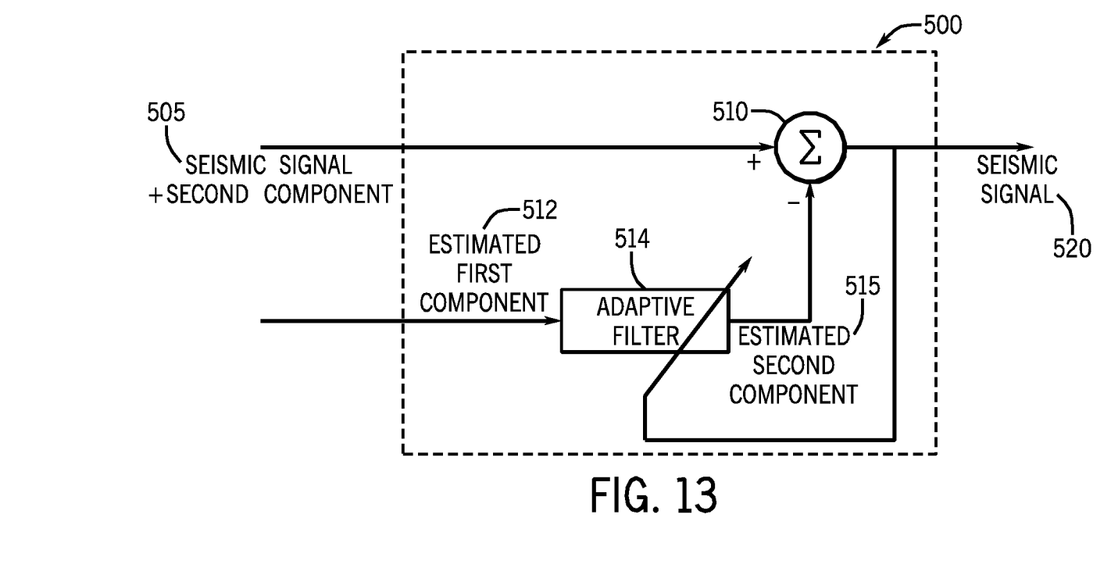
FIG. 13 is a schematic diagram of an adaptive cancellation system according to an embodiment of the invention.

As a more specific example, FIG. 13 depicts a system 500 for performing the adaptive interference cancellation according to an embodiment of the invention. The system 500 includes an adaptive filter 517 that receives an estimate 512 of the first component of the torque noise and produces an estimate 515 of the second component of the torque noise. This estimate 515 is subtracted (via adder 510) from the combined seismic signal and second component 505 to produce a corresponding estimate 520 of the seismic signal. This estimate 520 is then used to refine operation of the adaptive filter 514. More specifically, a cross-correlation between the estimates 512 and 520 is calculated to adjust the filter 514 such that when the filtering properties are appropriately adjusted, the cross correlation is minimized. Other systems and techniques may be used, in accordance with other embodiments of the invention.

Figure 14:
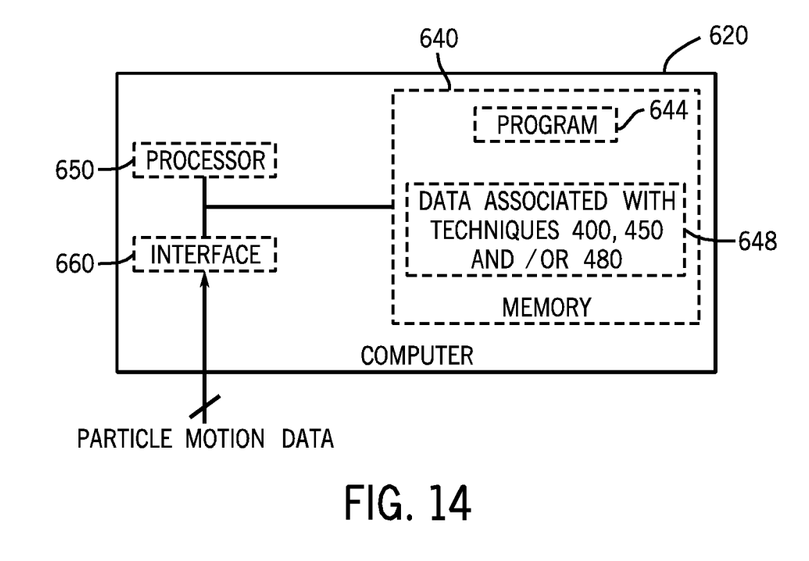
FIG. 14 is a schematic diagram of a data processing system according to an embodiment of the invention.

Referring to FIG. 14, in accordance with some embodiments of the invention, a data processing system 620 contains a processor 650 that processes acquired seismic data to perform at least some parts of one or more of the techniques that are disclosed herein for such purposes (as non-limiting examples) as receiving measurements from streamer-disposed particle motion sensors; applying selective wavenumber-frequency filters to derive the remove of the first component of the torque noise; estimating the second component of the torque noise from the first component estimate; applying a transfer function to estimate the second component from the first component; implementing an adaptive interference cancellation system to estimate the second component from the signal cone using the estimated first component as a noise reference signal; displaying images indicative of the estimated first and second components of the torque noise; displaying images indicative of the seismic signal estimated first component and/or estimated second component; etc.

In accordance with some embodiments of the invention, the processor 650 may be formed from one or more microprocessors and/or microcontrollers. As non-limiting examples, the processor 650 may be located on a streamer 30 (see FIG. 1), located on the vessel 20 (see FIG. 1), distributed among multiple streamers 30, located on a land-based processing facility, distributed among separate land-based facilities, etc.

As depicted in FIG. 14, the processor 650 may be coupled to a communication interface 660 for purposes of receiving such data as acquired particle motion measurements, data indicative of transfer function parameters, data indicative of adaptive filter parameters, data indicative of pressure measurements, data indicative of the first and/or second components of the torque noise, etc. As non-limiting examples, the communication interface 660 may be a Universal Serial Bus (USB) interface, a network interface, a removable media (a flash card, CD-ROM, etc.) interface or a magnetic storage interface (an IDE or SCSI interface, as non-limiting examples). Thus, the communication interface 660 may take on numerous forms, depending on the particular embodiment of the invention.

In accordance with some embodiments of the invention, the communication interface 660 may be coupled to a memory 640 of the system 620 and may store, for example, various input, output and/or intermediate result datasets involved in the techniques and systems that are described herein, such as the techniques 400, 450 and/or 480 and/or system 500. The memory 640 may store program instructions 644, which when executed by the processor 650 may cause the processor 650 to perform various tasks of one or more of the techniques and systems that are disclosed herein; and the system 620 may display preliminary, intermediate and/or final results obtained via the technique(s)/system(s) on a display device (not shown in FIG. 14) of the system 620, such as a computer monitor in accordance with some embodiments of the invention.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
receiving particle motion data acquired by particle motion sensors while in tow, the particle motion data being indicative of a seismic signal and torque noise and the sensors being oriented to modulate a wavenumber of a first component of the torque noise away from a signal cone associated with the seismic signal;
estimating the first component of the torque noise;
based on the estimated first component of the torque noise, estimating a second component of the torque noise inside the signal cone; and
suppressing the second component of the torque noise based at least in part on the estimated second component.

2. The method of claim 1, wherein the act of suppressing the second component of the torque noise comprises subtracting the estimated second component from a composite signal acquired by the particle motion sensors.

3. The method of claim 1, wherein the signal cone comprises a frequency-wavenumber space occupied by the seismic signal and the second component of the torque noise.

4. The method of claim 1, wherein the second component of the torque noise is attributable to at least one of sensor misalignment, a manufacturing irregularity and a sensor mounting irregularity.

5. The method of claim 1, wherein the act of estimating the second component of the torque noise comprises applying a transfer function to the estimated first component of the torque noise to estimate the second component of the torque noise.

6. The method of claim 1, wherein the act of estimating the first component of the torque noise comprises applying a selective frequency-wavenumber filter to data acquired by the particle motion sensors.

7. The method of claim 1, wherein the act of estimating the second component of the torque comprises applying adaptive interference cancellation.

8. The method of claim 7, further comprising:
using the estimated first component as a noise reference to an adaptive filter in the adaptive interference cancellation.

9. The method of claim 8, wherein the adaptive interference cancellation comprises using a least mean square adaptive algorithm, a recursive least square algorithm or a QR-recursive least square algorithm.

10. The method of claim 1, eccentrically disposing each of the particle motion sensors at an associated angle about an axis generally aligned with a direction of tow with respect to a reference line common to the associated angles and substantially varying the angles.

11. A system comprising:
an interface to receive seismic data indicative of measurements acquired by particle motion sensors while in tow, the measurements being indicative of a seismic signal and torque noise and the sensors being oriented to modulate a wavenumber of a first component of the torque noise away from a signal cone associated with the seismic signal; and
a processor to:
estimate the first component of the torque noise;
based on the estimated first component, estimate a second component of the torque noise inside the signal cone; and
suppress the second component based at least in part on the estimated second component.

12. The system of claim 11, wherein the processor is adapted to subtract the estimated second component of the torque noise from the measurements acquired by the seismic sensors.

13. The system of claim 11, wherein the signal cone comprises a frequency-wavenumber space occupied by the seismic signal and the second component of the torque noise.

14. The system of claim 11, wherein the second component of the torque noise is attributable to at least one of sensor misalignment, a manufacturing irregularity and a sensor mounting irregularity.

15. The system of claim 11, wherein the processor is adapted to apply a transfer function to the estimated first component of the torque noise to estimate the second component of the torque noise.

16. The system of claim 11, wherein the processor is adapted to apply a selective frequency-wavenumber filter to the measurements to estimate the first component of the torque noise.

17. The system of claim 11, wherein the processor is adapted to apply adaptive interference cancellation to estimate the second component of the torque noise using the estimated first component as a noise reference to an adaptive filter.

18. The system of claim 11, further comprising:
a streamer comprising the particle motion sensors; and
a vessel to tow the streamer.

19. The system of claim 11, wherein the processor is disposed on the streamer.

20. The system of claim 19, wherein each of the particle motion sensors is eccentrically disposed at an associated angle about an axis generally aligned with a direction of tow with respect to a reference line common to the associated angles and the angles are substantially varied.

21. An article comprising a computer readable storage medium to store instructions that when executed by a computer cause the computer to:
receive particle motion data acquired by particle motion sensors, the particle motion data being indicative of a seismic signal and torque noise while in tow and the particle motion sensor being oriented to modulate a wavenumber of a first component of the torque noise away from a signal cone associated with the seismic signal;
estimate the first component of the torque noise;
based on the estimated first component, estimate a second component of the torque noise inside the signal cone; and
suppress the second component based at least in part on the estimated second component.

22. The article of claim 21, wherein the processor is adapted to subtract the estimated second component of the torque noise from the measurements acquired by the seismic sensors.

23. The article of claim 21, wherein the signal cone comprises a frequency-wavenumber space occupied by the seismic signal and the second component of the torque noise.

24. The article of claim 21, wherein the second component of the torque noise is attributable to at least one of sensor misalignment, a manufacturing irregularity and a sensor mounting irregularity.

25. The article of claim 21, the storage medium storing instructions that when executed by the computer cause the computer to apply a transfer function to the estimated first component of the torque noise to estimate the second component of the torque noise.

26. The article of claim 21, the storage medium storing instructions that when executed by the computer cause the computer to apply adaptive interference cancellation to determine the estimated second component of the torque noise.

* * * * *